United States Patent [19]

König et al.

[11] Patent Number: 5,691,438
[45] Date of Patent: Nov. 25, 1997

[54] BLOCKED POLYISOCYANATES AND THEIR USE IN STOVING LACQUERS

[75] Inventors: Eberhard König, Leverkusen; Theodor Engbert, Köln, both of Germany

[73] Assignee: Bayer Aktiengesellschaft, Leverkusen, Germany

[21] Appl. No.: 633,940

[22] Filed: Apr. 17, 1996

[30] Foreign Application Priority Data

May 4, 1995 [DE] Germany .................. 19516400.8

[51] Int. Cl.$^6$ .................................................. C08G 18/80
[52] U.S. Cl. .................. 528/45; 528/59; 528/73; 252/182.22
[58] Field of Search ................. 528/45, 73, 59; 252/182.22

[56] References Cited

U.S. PATENT DOCUMENTS

| | | | |
|---|---|---|---|
| 3,721,645 | 3/1973 | Zemlin | 260/45.8 N |
| 4,369,301 | 1/1983 | Konig et al. | 528/45 |
| 4,482,721 | 11/1984 | Wegner et al. | 548/262 |
| 4,940,750 | 7/1990 | Rosthauser et al. | 524/871 |
| 5,350,825 | 9/1994 | König et al. | 528/45 |

FOREIGN PATENT DOCUMENTS

| | | |
|---|---|---|
| 2135691 | 5/1995 | Canada . |
| 4416750 | 11/1995 | Germany . |

*Primary Examiner*—Rachel Gorr
*Attorney, Agent, or Firm*—Joseph C. Gil; Thomas W. Roy

[57] ABSTRACT

Polyisocyanates which have 1,2,4,-triazole-blocked isocyanate groups and a blocked isocyanate group content of 7 to 14 wt. % and which are reaction products of A) a polyisocyanate component selected from (i) lacquer polyisocyanates based on (cyclo)aliphatic diisocyanates or (ii) mixtures of these lacquer polyisocyanates with cycloaliphatic diisocyanates of a maximum molecular weight of 300, B) 50 to 80 equivalent-%, based on the isocyanate groups of component A), of a monofunctional isocyanate group blocking agent containing at least 90 wt. % of 1,2,4-triazole, C) 10 to 30 equivalent-%, based on the isocyanate groups of component A), of a polyester component having an OH number of 56 to 250 and D) 0 to 20 equivalent-%, based on the isocyanate groups of component A), of selected hydrazine derivatives.

The present invention is also directed to the use of these blocked polyisocyanates as crosslinking agents in one-component polyurethane stoving lacquers.

3 Claims, No Drawings

BLOCKED POLYISOCYANATES AND THEIR USE IN STOVING LACQUERS

BACKGROUND OF THE INVENTION

1. Field of the Invention

The present invention relates to novel 1,2,4-triazole-blocked lacquer polyisocyanates having a low tendency to crystallize and to their use as crosslinking agents in stoving lacquers.

2. Description of the Prior Art

Of the many blocking agents for isocyanate groups, only 1,2,4-triazole satisfies the dual requirements of a low unblocking temperature of 130° to 140° C. and low thermal yellowing of the resulting polyurethane coating. However, 1,2,4-triazole suffers from the disadvantage that lacquer polyisocyanates blocked with this compound tend to crystallize (which may also be advantageous in the production of powder coating crosslinking agents, see, e.g., U.S. Pat. No. 4,482,721 ) or they cannot be dissolved in lacquer solvents to yield low viscosity solutions which satisfy current requirements with regard to their solids content. For this reason, coblocked polyisocyanates were developed which no longer suffer this disadvantage (see, e.g., EP-A-0,600,314 and German patent applications P 44 167 50.4 and P 43 39 367.5), but which often do not completely satisfy current requirements with regard to yellowing resistance.

Due to the outstanding thermal yellowing resistance of lacquer polyisocyanates which are predominantly, preferably exclusively, blocked with 1,2,4-triazole, an object of the invention is to provide such lacquer polyisocyanates which have a reduced viscosity when dissolved in lacquer solvents.

This object may be achieved with the lacquer polyisocyanates according to the present invention, which are described below in greater detail.

SUMMARY OF THE INVENTION

The present invention relates to polyisocyanates which have 1,2,4,-triazole-blocked isocyanate groups, a viscosity as a 60 wt. % solution in diethylene glycol mono-n-butyl ether acetate of at most 10,000 mPa·s at 23° C., and a blocked isocyanate group content (calculated as NCO, molecular weight 42), based on solids, of 7 to 14 wt. %, and which are the reaction products of A) a polyisocyanate component having an NCO content of 12 to 24 wt. % selected from (i) lacquer polyisocyanates prepared from (cyclo)aliphatic diisocyanates and containing allophanate, biuret, isocyanurate, uretidione and/or urethane groups or (ii) mixtures of (i) with cycloaliphatic diisocyanates having a maximum molecular weight of 300, wherein at least 30 wt. % of the (cyclo)aliphatic diisocyanates present in component A) as lacquer polyisocyanates (i) or as mixtures (ii) are cycloaliphatic diisocyanates having methyl substituents and a maximum molecular weight of 222, with B) 50 to 80 equivalent-%, based on the isocyanate groups of component A), of a monofunctional blocking agent for isocyanate groups containing at least 90 wt. % of 1,2,4-triazole, C) 10 to 30 equivalent-%, based on the isocyanate groups of component A), of a polyester component having an OH number of 56 to 250 and containing at least one linear polyester diol and D) 0 to 20 equivalent-%, based on the isocyanate groups of component A), of a hydrazine derivative corresponding to the formula

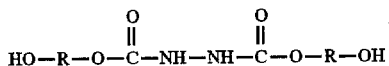

and/or

wherein

R represents a saturated hydrocarbon residue having 2 to 5 carbon atoms in which at least 2 carbon atoms are arranged between the two oxygen atoms.

The present invention also relates to the use of these blocked polyisocyanates as crosslinking agents in one-component polyurethane stoving lacquers.

DETAILED DESCRIPTION OF THE INVENTION

In accordance with the present invention the viscosity of the blocked polyisocyanate is determined as a 60 wt. % solution in diethylene glycol mono-n-butyl ether acetate at 23° C. by rotational viscosimetry according to DIN 53 019 with an SV-DIN rotor at a shear gradient of 50 $sec^{-1}$.

Starting component A), which is used for the production of the blocked polyisocyanates according to the invention, has an NCO content of 12 to 24, preferably of 15 to 20 wt. %. The term "(cyclo)aliphatic" means "aliphatic and/or cycloaliphatic."

Component A) is selected from (i) lacquer polyisocyanates having (cyclo)aliphatically-bound isocyanate groups or (ii) mixtures of these lacquer polyisocyanates with up to 80, preferably up to 60 NCO equivalent-% of diisocyanates having exclusively cycloaliphatically-bound isocyanate groups and a maximum molecular weight of 300. An essential feature of the invention is that at least 30, preferably 50 wt. % of the total content of diisocyanates, i.e., both those present in the form of unmodified diisocyanates and those present in the lacquer polyisocyanates, are cycloaliphatic diisocyanates which have a maximum molecular weight of 222, preferably a molecular weight of 180 to 222, and have at least one methyl substituent on the cycloaliphatic ring. "Cycloaliphatic diisocyanates" also include any diisocyanates which have isocyanate groups attached to aliphatic or cycloaliphatic carbon atoms and at least one cycloaliphatic ring, preferably a cyclohexane ring, per molecule.

Suitable lacquer polyisocyanates (i) are known derivatives of monomeric diisocyanates which have allophanate, biuret, isocyanurate, uretidione and/or urethane groups. Monomeric diisocyanates include (cyclo)aliphatic diisocyanates such as hexamethylene diisocyanate (HDI), 1-isocyanato-3,3,5-trimethyl-5-isocyanatomethylcyclohexane (IPDI), 1-methyl-2,4-diisocyanatocyclohexane and mixtures thereof with up to 35 wt. %, based on the weight of the mixture, of 1-methyl-2, 6-diisocyanatocyclohexane (HTDI) and 4,4'-diisocyanatodicyclohexylmethane (HMDI). HTDI and IPDI are preferred cycloaliphatic diisocyanates having at least one methyl substituent, while IPDI is most preferred.

Lacquer polyisocyanates or blends thereof with monomeric diisocyanates are also suitable as component A). These mixtures may be produced by blending the individual components or may be produced in situ by not removing or only partially removing the excess starting diisocyanates used to produce the lacquer polyisocyanates after completion of the modification reaction.

1,2,4-triazole is used as blocking agent B). In accordance with the present invention, it is possible, but not preferred, to use mixtures of this blocking agent with other known blocking agents, such as 3,5-dimethylpyrazole, diisopropylamine, diethyl malonate and butanone oxime.

Component C) is selected from linear polyester diols having an OH number of 56 to 250, preferably of 150 to 230 mg KOH/g. Suitable starting materials for the production of these polyester diols are alkanediols, such as 1,6-hexanediol and/or neopentyl glycol, and adipic acid or ε-caprolactone. Adipic acid/neopentyl glycol polyester diols and 1,6-hexanediol/ε-caprolactone polyester diols are particularly preferred.

Component D), which may optionally be present, is selected from hydrazine derivatives corresponding to the formula previously set forth. These hydrazine derivatives are produced by reacting hydrazine hydrate with cyclic carbonates, such as ethylene, isopropylene or neopentylene carbonate, in accordance with the teachings of EP-A-0,050,284.

The addition product prepared from 1 mole of hydrazine and 2 moles of 1,2-propylene carbonate is preferably used:

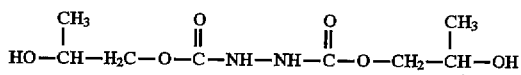

Component D) is preferably used in quantities of 5 to 15 equivalent-%, based on the isocyanate groups of component A), wherein the terminal hydroxyl and primary amino groups, but not the internal NH groups, are included in the calculation as monofunctional groups capable of reacting with isocyanate groups.

During production of the blocked polyisocyanates according to the invention, the stated starting materials are used in quantities corresponding to an equivalent ratio of the isocyanate groups of component A) to the isocyanate-reactive groups of components B) to D) of 0.9:1 to 1.0:1. The blocked polyisocyanates according to the invention accordingly contain at most 0.5 wt. % of unblocked isocyanate groups, and preferably do not contain any unblocked isocyanate groups.

The blocked polyisocyanates according to the invention may be prepared in accordance with two different embodiments, in which solvents such as 1-methoxy-2-propyl acetate, n-butyl acetate and/or diethylene glycol mono-n-butyl ether acetate, are generally used at least at the end of the preparation procedure in quantities such that 40 to 80, preferably 50 to 70 wt. % solutions of the blocked polyisocyanates are obtained.

According to the first embodiment for the production of the blocked polyisocyanates, all of components A) to D) are initially introduced into a solvent and gradually heated to 90° to 120° C., preferably 100° to 110° C., until the theoretical NCO content is obtained, preferably until all of the isocyanate groups have reacted.

In addition to this "one-pot" process, it is also possible to react the stated starting materials in stages, for example, in such a manner that a proportion of isocyanate component A), for example, monomeric IPDI, is first reacted with component D) and then the remaining starting components and solvent are added and reacted at temperatures of 90° to 120° C., preferably 100° to 110° C., until the theoretical NCO content is obtained, preferably until all the NCO groups have reacted.

The blocked polyisocyanates according to the invention may be combined with polyhydroxyl compounds known from lacquer chemistry and used in stoving lacquers. Examples of these compounds include polyester and/or polyacrylate resins having hydroxyl groups. The resulting compositions constitute binders for one-component polyurethane stoving coating compositions which may be cured at stoving temperatures of approximately 140° C. for a period of approximately 30 minutes without appreciable thermal yellowing. Clear coatings obtained in this manner are also distinguished by excellent elasticity and increased scratch resistance.

Stoving lacquers containing the blocked polyisocyanates according to the invention are suitable, in particular, as automotive coatings.

In the following examples, all parts and percentages relate to weight, unless otherwise indicated.

Example 1 (according to the invention)

| | |
|---|---|
| 141.6 g (0.6 g equiv.) | of an 80% solution in ethylene glycol mono-n-butyl ether acetate having an NCO content of the solution of 17.8% of a mixed trimerization product produced by partial trimerization of the isocyanate groups of a mixture of 90 parts by weight of IPDI and 10 parts by weight of HMDI |
| 80.0 g (0.4 g equiv.) | of an HDI-based polyisocyanate containing isocyanurate, NCO content approx. 21%, viscosity at 23° C. approx. 3,000 mpa · s |
| 221.6 g (1.0 g equiv.) | of NCO component |
| 11.8 g (0.1 g equiv.) | of the addition product of 1 mole of hydrazine and 2 moles of propylene carbonate |
| 84.0 g (0.2 g equiv.) | of an adipic acid/1,6-hexanediol polyester, OH number 134 |
| 48.3 g (0.7 mol) | of 1,2,4-triazole |
| 196.7 g (60%) | of diethylene glycol monobutyl ether acetate |
| 562.4 g (0.7 g equiv.) | of blocked NCO groups |
| | Calculated NCO content (blocked): 5.2% |
| | Solids content: 60% |
| | Viscosity at 23° C.: 6,000 mpa · s |

Performance:

The two polyisocyanates were introduced into a vessel. The hydrazine/propylene carbonate addition product, the adipic acid polyester, diethylene glycol monobutyl ether acetate and the white 1,2,4-triazole flakes were added to this mixture. The temperature was raised in stages to 105° C., and after a reaction time of approximately 4 hours no free NCO groups were detectable by IR spectroscopy. After cooling, a clear, virtually colorless solution having a viscosity at 23° C. of approximately 5,000 mPa·s was obtained. For further processing as a clear lacquer, the calculated (blocked) NCO equivalent weight was approximately 807 g.

Example 2 (according to the invention)

Reaction mixture:

| | |
|---|---|
| 22.2 g (0.2 g equiv.) | of IPDI |
| 157.5 g (0.45 g equiv.) | of an IPDI-based, isocyanurate group-containing polyisocyanate, 70% in 1-methoxy-2-propyl acetate/xylene, NCO content of solution 12% |
| 70.0 g (0.35 g equiv.) | of the HDI trimer described in Example 1 |
| 249.7 g (1.0 g equiv.) | of NCO component |
| 11.8 g (0.1 g equiv.) | of the addition product of 1 mole of hydrazine and 2 moles of propylene carbonate |
| 32.5 g (0.1 g equiv.) | of a 1,6-hexanediol/ε-caprolactone polyester, OH number 172 |
| 55.9 g (0.81 mol) | of 1,2,4-triazole |
| 154.4 g (=60%) | of 1-methoxy-2-propyl acetate |
| 504.3 g (0.8 g equiv.) | of blocked NCO groups |
| | Calculated NCO content (blocked): 6.6% |
| | Solids content: 60% |
| | Viscosity at 23° C.: approx. 8,400 mpa·s |

Performance:

IPDI, the hydrazine/propylene carbonate addition product and 22.6 g of methoxypropyl acetate, corresponding to a 60% solution, were heated to 105° C. while being stirred. After a reaction time of approximately 4 hours, the theoretical NCO content of 7.4% was obtained. This reaction yielded a linear IPDI prepolymer with the hydrazine addition product. The mixture was allowed to cool to approximately 80° C. and mixed with the other two NCO components. The remaining solvent, the ε-caprolactone polyester and white 1,2,4-triazole flakes were then stirred in. As Example 1, the mixture was reacted at 105° C. for approximately 4 hours until no free NCO groups were detectable by IR spectroscopy. After cooling, a clear, virtually colorless solution having a viscosity at 23° C. of approximately 8,000 mPa·s was obtained. The solution had a calculated (blocked) NCO equivalent weight of approximately 637 g.

Example 3 (according to the invention)

Clear lacquer compositions prepared from the blocked crosslinking agents of Examples 1 and 2

1. Preparation of clear coating composition

A mixed polyol component containing a conventional commercial polyacrylate polyol (Desmophen A TP LS 2051 from Bayer AG, Leverkusen, 75% solution in xylene, OH content of the solution 4.7%) and a flexibilizing polyester (Desmophen TP LS 2971 from Bayer AG, Leverkusen, 80% solution in n-butyl acetate, OH content of the solution 3.8%) was used for production of the clear coating compositions.

| 80 | OH equivalent % of polyacrylate | 290 g |
|---|---|---|
| 20 | OH equivalent % polyester | 90 g |
| 100 | OH equivalent % of OH component | 380 g |

The clear coating compositions were produced by mixing the above polyol component with the crosslinking agents of Examples 1 and 2 and with the addition of a catalyst as set forth below. The NCO/OH equivalent ratio was 1:1.

| Clear coating composition | Polyisocyanate | Polyol component | Catalysis with 0.1% of dibutyltin dilaurate |
|---|---|---|---|
| A | Example 1 807 g | 380 g | 1.1 g |
| B | Example 2 637 g | 380 g | 1.0 g |

The clear coating compositions were applied at a wet film thickness of approximately 120 to 150 μm onto metal test sheets coated with a conventional commercial aqueous base lacquer, for example, from Spies & Hecker, Cologne.

The metal test sheets were then stoved for 30 minutes at 140° C. in a drying cabinet. The first colorimetric measurement was then made using the CIE-LAB method. The higher the positive b value determined in this manner, the greater the yellow discoloration of the clear coating.

Restoving was then performed for 30 minutes at 160° C. and the increase in yellow coloration, the Δb value was measured using the CIE-LAB color system (DIN 6174). For non-yellowing clear coatings, this value should be as close to 0 as possible.

The results for clear coatings A and B are summarized below.

| Clear coating | Thermal yellowing after stoving (b) | Thermal yellowing after restoving (Δb) | Film thickness [μm] |
|---|---|---|---|
| A | 0.4 | 0.8 | 55 |
| B | 0.3 | 0.7 | 55 |

The thermal yellowing values for both clear lacquers A and B were similar, but coating B was better after both stoving and restoving. The thermal yellowing values for an isocyanurate group containing polyisocyanate prepared from HDI (which was used as a portion of the NCO component in Examples 2 and 3) and blocked with butanone oxime was also tested as a comparison. The thermal yellowing values of the comparison were much poorer, i.e., b=1.3 after stoving and Δb=1.9 after restoving.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate which has 1,2,4,-triazole-blocked isocyanate groups, a viscosity as a 60 wt. % solution in diethylene glycol mono-n-butyl ether acetate of at most 10,000 mPa·s at 23° C., and a blocked isocyanate group content (calculated as NCO, molecular weight 42), based on solids, of 7 to 14 wt. %, and which is the reaction product of A) a polyisocyanate component having an NCO content of 12 to 24 wt. % selected from (i) lacquer polyisocyanates prepared from (cyclo)aliphatic diisocyanates and containing allophanate, biuret, isocyanurate, uretidione and/or urethane groups or (ii) mixtures of (i) with cycloaliphatic diisocyanates having a maximum molecular weight of 300, wherein at least 30 wt. % of the (cyclo)aliphatic diisocyanates present in component A) as lacquer polyisocyanates (i) or as mixtures (ii) are cycloaliphatic diisocyanates having methyl substituents and a maximum molecular weight of 222, with B) 50 to 80 equivalent-%, based on the isocyanate groups of component A), of a monofunctional blocking agent for isocyanate groups containing at least 90 wt. % of 1,2,4-triazole, C) 10 to 30 equivalent-%, based on the isocyanate groups of component A), of a polyester component having an OH number of 56 to 250 and containing at least one linear polyester diol and D) 0 to 20 equivalent-%, based on the isocyanate groups of component A), of a hydrazine derivative corresponding to the formula

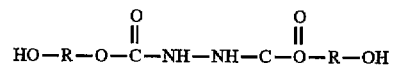

and/or

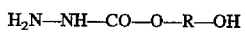

wherein

R represents a saturated hydrocarbon residue having 2 to 5 carbon atoms in which at least 2 carbon atoms are arranged between the two oxygen atoms.

2. A one-component stoving lacquer containing the blocked polyisocyanate of claim 1.

3. The polyisocyanate of claim 1 wherein said lacquer polyisocyanates (i) contain allophanate, biuret, isocyanurate and/or uretdione groups.

* * * * *